(12) United States Patent
Liu et al.

(10) Patent No.: US 12,412,415 B2
(45) Date of Patent: Sep. 9, 2025

(54) METHOD FOR CAPACITIVE FINGERPRINT IDENTIFICATION, CAPACITIVE FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventors: Yi Liu, Shenzhen (CN); Dayu Ding, Shenzhen (CN); Zhichuan Liao, Shenzhen (CN); Chao Yuan, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 485 days.

(21) Appl. No.: 17/862,833

(22) Filed: Jul. 12, 2022

(65) Prior Publication Data

US 2022/0358781 A1    Nov. 10, 2022

Related U.S. Application Data

(63) Continuation of application No. PCT/CN2021/083033, filed on Mar. 25, 2021.

(51) Int. Cl.
*G06V 40/13* (2022.01)

(52) U.S. Cl.
CPC ................... *G06V 40/1306* (2022.01)

(58) Field of Classification Search
CPC .............................................. G06V 40/1306

(Continued)

(56) References Cited

U.S. PATENT DOCUMENTS

| 7,545,621 B2 | 6/2009 | Haddad |
| 2008/0075339 A1 | 3/2008 | Haddad |
| 2008/0144894 A1 | 6/2008 | Bichigov et al. |

FOREIGN PATENT DOCUMENTS

| CN | 105556439 A | 5/2016 |
| CN | 105630254 A | 6/2016 |

(Continued)

OTHER PUBLICATIONS

Zhou Sichun et al. "Sensor Technology and Engineering Applications" Beijing: China Atomic Energy Press, Sep. 2007, pp. 91-93.

(Continued)

*Primary Examiner* — Sheela C Chawan

(57) ABSTRACT

A method for capacitive fingerprint identification. The method is applied to an electronic device with a capacitive fingerprint identification apparatus which has a special-shaped surface. The method includes: obtaining a number of driving signals N(i) of an $i^{th}$ column of pixel electrodes; and performing signal driving to the $i^{th}$ column of pixel electrodes to obtain an output voltage according to the number of driving signals N(i), the output voltage corresponds to the capacitor, and the output voltage is configured for fingerprint identification. The present application can controls a column average output voltage of the pixel electrode at a similar level, so as to facilitate algorithmic processing, at the same time, a risk of data saturation with up and down fluctuations is reduced, and thereby the performance of fingerprint identification is improved.

17 Claims, 9 Drawing Sheets

(58) Field of Classification Search
USPC .......................................................... 382/100
See application file for complete search history.

(56) References Cited

FOREIGN PATENT DOCUMENTS

| | | | | | |
|---|---|---|---|---|---|
| CN | 107944411 | A | | 4/2018 | |
| CN | 110390245 | A | | 10/2019 | |
| CN | 110674686 | A | | 1/2020 | |
| CN | 111158525 | A | * | 5/2020 | ........... G06F 3/0412 |
| CN | 111522469 | A | | 8/2020 | |
| CN | 112416181 | A | | 2/2021 | |
| CN | 212724041 | U | * | 3/2021 | |
| KR | 20160141414 | A | | 12/2016 | |
| KR | 20190010244 | A | | 1/2019 | |

OTHER PUBLICATIONS

Behzad Razavi "Design of Analog CMOS Integrated Circuits." Xian Jiaotong University Press; Feb. 1, 2003; pp. 357-359.

* cited by examiner

1000

METHOD FOR CAPACITIVE FINGERPRINT IDENTIFICATION, CAPACITIVE FINGERPRINT IDENTIFICATION APPARATUS AND ELECTRONIC DEVICE

CROSS-REFERENCE TO RELATED APPLICATIONS

This application is a continuation of International Application No. PCT/CN2021/083033, filed on Mar. 25, 2021, the disclosure of which is hereby incorporated by reference in its entirety.

TECHNICAL FIELD

The present application relates to the field of capacitive fingerprint technologies, and more particularly, to a method for capacitive fingerprint identification, a capacitive fingerprint identification apparatus and an electronic device.

BACKGROUND

At present, with the development of a biometric sensor, especially the rapid development of a fingerprint identification sensor, the fingerprint identification sensor is widely used in mobile terminal equipment, smart home, automotive electronics and other fields. The market demand for the biometric sensor is increasing day by day, and the market demand volume is getting bigger and bigger. Users' requirements for products are not only the pursuit of high quality and high performance, but also the diversification of appearance demand, and the aesthetic vision of different user groups is also diverse.

At present, capacitive fingerprint apparatus in the mainstream market are all planar structures, with a relatively single appearance and no three-dimensional sense, and the customer experience is not novel enough. In addition, dust and other substances are often easily adsorbed on a planar capacitive fingerprint apparatus, resulting in misjudgment and other problems in fingerprint identification. Moreover, when a mobile phone is dropped, it may cause damage to a plane of an entire capacitive fingerprint identification apparatus, affecting the performance of fingerprint identification apparatus.

Therefore, how to improve the performance of capacitive fingerprint identification apparatus and the user experience becomes an urgent technical problem to be solved.

SUMMARY

Embodiments of the present application provide a method for capacitive fingerprint identification, a capacitive fingerprint identification apparatus and an electronic device, which may improve performance of capacitive fingerprint identification.

In a first aspect, provided is a method for capacitive fingerprint identification, the method is applied to an electronic device with a capacitive fingerprint identification apparatus, the capacitive fingerprint identification apparatus is configured to be disposed on a special-shaped surface of the electronic device, the capacitive fingerprint identification apparatus incudes a pixel electrode array, the pixel electrode array is configured to form capacitance with a finger touching the special-shaped surface, the pixel electrode array incudes M columns of pixel electrodes, where each pixel electrode in the same column of pixel electrodes has a same distance from the special-shaped surface, M is an integer greater than 1, and the method incudes: acquiring a number of driving signals $N(i)$ of an $i^{th}$ column of pixel electrodes; performing signal driving to the $i^{th}$ column of pixel electrodes to obtain an output voltage according to the number of driving signals $N(i)$, the output voltage corresponds to the capacitor, and the output voltage is configured for fingerprint identification; and where the number of driving signals $N(i)$ corresponding to the $i^{th}$ column of pixel electrodes is positively correlated with a distance D between the $i^{th}$ column of pixel electrodes and the special-shaped surface, i is a serial number of the M columns of pixel electrodes, i is an integer greater than or equal to 1, and i is less than or equal to M.

It should be understood that the special-shaped plane in the embodiments of the present application may refer to a plane with an irregular surface shape.

In planar capacitive fingerprint identification, on the one hand, a planar structure has a single appearance, and the customer experience is not good, on the other hand, dust and other things are easily adsorbed on a planar capacitive fingerprint identification apparatus, resulting in misjudgment in the fingerprint identification. Embodiments of the present application provide a method for capacitive fingerprint identification that may be applied to an electronic device with a special-shaped plane, so that the capacitive fingerprint identification apparatus may be applied to the electronic devices with surfaces of various different shapes, thereby the customer experience may be improved, and at the same time, different from the planar structure, the distance between the special-shaped surface of the electronic device and the capacitive fingerprint identification apparatus is different, if a method for planar capacitive fingerprint identification in the prior art continues to be used, there will be a larger difference in a signal amount of each part obtained by the capacitive fingerprint identification apparatus, resulting in poor fingerprint identification, thus affecting the performance of fingerprint identification. Moreover, the obtained data presents an arc shape as a whole, and the data is easily saturated with up and down fluctuations, which is not conducive to later algorithm processing, and then may affect the fingerprint identification. Based on this, a method for fingerprint identification provided in the embodiments of the present application may allocate a separate number of driving signals for each column of pixel electrodes according to a distance between the pixel electrode and the special-shaped surface, this may increase the signal amount at a position with a large distance between the pixel electrode and the special-shaped surface, so as to be conducive to the fingerprint identification. At the same time, the signal amount corresponding to each part of the special-shaped surface obtained by the capacitive fingerprint identification apparatus may be controlled at a similar level to facilitate algorithm processing, and at the same time, a risk of data saturation with up and down fluctuations is reduced, thereby an aim of improving the performance of fingerprint identification is achieved.

It should be understood that a column of pixel electrodes in the embodiments of the present application may refer to a plurality of adjacent rows or columns of pixel electrodes with a same distance from the special-shaped surface, and may be a vertical column in the embodiments of the present application, or a horizontal row. The definition of the specific row and column may be set according to the actual situation, which is not limited in the embodiments of the present application.

In a possible implementation manner, a value of the number of driving signals $N(i)$ of the $i^{th}$ column of pixel electrodes is related to an average output voltage value of the M columns of pixel electrodes when using a same number of driving signals.

It should be understood that in the capacitive fingerprint identification of the embodiments of the present application, the difference in the distance between the pixel electrode and the special-shaped surface may lead to a large difference in the detected capacitance. When a charge detection method is used, this difference may be reflected in the output voltage value. Therefore, the number of driving signals corresponding to each column of pixel electrodes in the embodiments of the present application is related to the average output voltage value of the M columns of pixel electrodes when using the same number of driving signals; or optionally, the number of driving signals of each column of pixel electrodes in the embodiments of the present application may not be reflected by the average output voltage either, but directly related to the distance between the pixel electrode and the special-shaped surface. By adjusting the value of the number of driving signals N according to the average output voltage or the above distance, the capacitive fingerprint identification apparatus may be made to obtain flatter data, which facilitates the algorithm processing, and thereby the performance of capacitive fingerprint identification is improved.

In a possible implementation manner, the number of driving signals N(i) of the ith column of pixel electrodes is expressed as:

$$N(i) = (\text{target value} - avgA(i)) * \frac{N_b - N_a}{avgB(i) - avgA(i)} + N_a,$$

where the target value is a predefined average output voltage value of the M columns of pixel electrodes, $N_a$ and $N_b$ are two different fixed number of driving signals, $N_a$ and $N_b$ are integers greater than or equal to 1, and avgA(i) and avgB(i) are the average output voltage values of the $i^{th}$ column of pixel electrodes corresponding to the number of driving signals $N_a$ and $N_b$ respectively.

The number of driving signals corresponding to each column of pixel electrodes is obtained according to the average output voltage of each column of pixel electrodes when the M columns of pixel electrodes use the same fixed number of driving signals, and the average output voltage of each column of pixel electrodes is essentially related to the capacitance formed between the pixel electrode and the special-shaped surface, and the capacitance is related to the distance between the pixel electrode and the special-shaped surface. Therefore, the number of driving signals for each column of pixel electrodes in the embodiments of the present application is determined according to the distance, the number of driving signals is allocated for each column of pixel electrodes by the distance between the pixel electrode and the special-shaped surface, the pixel electrode at the large distance may be allocated with a larger number of driving signals, so that the corresponding obtained signal amount may be increased to be conducive to the fingerprint identification. At the same time, by allocating the number of driving signals for each column of pixel electrodes according to the distance, the obtained signal amount corresponding to each position of the special-shaped surface may be controlled at a similar level to be conducive to later algorithm processing, and at the same time, the direction of data saturation with up and down fluctuations is avoided, and thereby the performance of fingerprint identification is improved.

In a possible implementation manner, the capacitive fingerprint identification apparatus further includes an analog-to-digital conversion module configured to convert the output voltage, where the target value is half of a maximum output value of the analog-to-digital conversion module.

By setting the target value at half of the maximum output value of the analog-to-digital conversion module, the output voltage data obtained by the capacitive fingerprint identification apparatus may be made in the middle position of the data processing range of the analog-to-digital conversion module, so that the small range fluctuation of the output voltage data may be covered in the processing range of the analog-to-digital conversion module, which may facilitate the algorithm processing, and thereby the performance of fingerprint identification is improved.

It should be understood that, in the embodiments of the present application, the target value may be set at half of the maximum output value of the analog-to-digital conversion module, or the setting range may also be expanded, such as the range of two-thirds to one-third, the specific setting may be determined according to the actual situation, which is not limited in the embodiments of the present application.

In a possible implementation manner, the capacitive fingerprint identification apparatus further includes: M registers, each register of the M registers is configured to store the number of driving signals N of each column of pixel electrodes, and the method further includes: performing signal driving to the M columns of pixel electrodes respectively according to the number of driving signals N of each column of pixel electrodes stored in each register.

The number of driving signals in the embodiments of the present application may be stored in the register, and the capacitive fingerprint identification apparatus may perform signal driving to the pixel electrode according to the number of driving signals stored in the register.

Optionally, the embodiments of the present application may include M registers. At this time, each column of pixel electrodes may be configured with one register, when a signal driving module performs signal driving, the corresponding number of driving signals may be read from the register of each column, and then performs signal driving to the corresponding column of pixel electrodes.

In a possible implementation manner, the capacitive fingerprint identification apparatus further includes: a special-shaped touch interface, the special-shaped touch interface is configured to accept the touch of a finger.

In a possible implementation manner, the special-shaped touch interface is an arc-shaped touch interface.

The capacitive fingerprint identification apparatus in the embodiments of the present application may also include the special-shaped touch interface matched with the special-shaped surface of the electronic device, and optionally, the special-shaped touch interface may be the arc-shaped touch interface.

In a second aspect, provided is a capacitive fingerprint identification apparatus configured to be disposed on the special-shaped surface of the electronic device, the apparatus includes: a pixel electrode array configured to form capacitance with a finger touching the special-shaped surface, the pixel electrode array includes M columns of pixel electrodes, where each pixel electrode in the same column of pixel electrodes has a same distance from the special-shaped surface, and M is an integer greater than 1; a signal driving module configured to perform signal driving to the $i^{th}$ column of pixel electrodes to obtain an output voltage according to the number of driving signals N(i) of the $i^{th}$ column of pixel electrodes, the output voltage corresponds to the capacitor, and the output voltage is configured for fingerprint identification; and where the number of driving signals N(i) corresponding to the $i^{th}$ column of pixel electrodes is positively correlated with a distance D between the $i^{th}$ column of pixel electrodes and the special-shaped surface, i is a serial number of the M columns of pixel electrodes, i is an integer greater than or equal to 1, and i is less than or equal to M.

The capacitive fingerprint identification apparatus of the embodiments of the present application may be applied to an electronic device with a special-shaped surface. On the one hand, the user experience may be improved; on the other hand, by a method of separately configuring the number of driving signals for each column of pixel electrodes, and the configured number of driving signals is positively correlated with the distance between the pixel electrode and the special-shaped surface, so that the pixel electrode corresponding to the special-shaped surface with the large distance in the capacitive fingerprint identification apparatus may have a higher number of driving signals, so that it may be made to obtain a larger signal amount, which may be conducive to the fingerprint identification. At the same time, by allocating different number of driving signals for the pixel electrodes with different distances from the special-shaped surface, the obtained data may be made flatter, the difficulty of the algorithm processing is reduced, and the risk of data saturation may be reduced, and thereby a role of improving the performance of fingerprint identification may be achieved.

In a possible implementation manner, the value of the number of driving signals N(i) of the $i^{th}$ column of pixel electrodes is related to the average output voltage value of the M columns of pixel electrodes when using the same number of driving signals.

In a possible implementation manner, the number of driving signals N(i) of the $i^{th}$ column of pixel electrodes is expressed as:

$$N(i) = (\text{target value} - avgA(i)) * \frac{N_b - N_a}{avgB(i) - avgA(i)} + N_a,$$

where the target value is a predefined average output voltage value of each column of pixel electrodes, $N_a$ and $N_b$ are two different fixed number of driving signals, $N_a$ and $N_b$ are integers greater than or equal to 1, and avgA(i) and avgB(i) are the average output voltage values of the ith column of pixel electrodes corresponding to the number of driving signals $N_a$ and $N_b$ respectively.

In a possible implementation manner, the capacitive fingerprint identification apparatus further includes an analog-to-digital conversion module configured to convert the output voltage, where the target value is half of the maximum output value of the analog-to-digital conversion module.

In a possible implementation manner, the capacitive fingerprint identification apparatus further includes: M registers, each register of the M registers is configured to store the number of driving signals N of each column of pixel electrodes, and the signal driving module is specifically configured to: perform signal driving to the M columns of pixel electrodes respectively according to the number of driving signals N of each column of pixel electrodes stored in each register.

In a possible implementation, the capacitive fingerprint identification apparatus includes the M registers, and the M registers are in one-to-one correspondence with the M columns of pixel electrodes.

In a possible implementation manner, the capacitive fingerprint identification apparatus further includes: a special-shaped touch interface, the special-shaped touch interface is configured to accept the touch of a finger.

In a possible implementation manner, the special-shaped touch interface is an arc-shaped touch interface.

In a third aspect, provided is an electronic device, including a processing apparatus; and the capacitive fingerprint identification apparatus in the second aspect or any possible embodiment of the second aspect, the capacitive fingerprint identification apparatus is disposed on the special-shaped surface of the electronic device, and the processing apparatus processes the data output by the capacitive fingerprint identification apparatus to realize the capacitive fingerprint identification.

In a possible implementation manner, the special-shaped surface is an arc-shaped surface.

The capacitive fingerprint identification apparatus in the embodiments of the present application may be applied to the electronic devices having various special-shaped surfaces of different thicknesses. The method for capacitive fingerprint identification in the embodiments of the present application may be realized as long as the number of driving signals is allocated separately for the pixel electrodes with different distances from the special-shaped surface.

In a possible implementation manner, the capacitive fingerprint identification apparatus is located on a side of the electronic device.

By disposing the capacitive fingerprint identification apparatus on the side of the electronic device, the user experience may be improved.

DESCRIPTION OF EMBODIMENTS

Technical solutions in the embodiments of the present application will be described hereinafter with reference to accompanying drawings.

As a common application scene, a capacitive fingerprint identification apparatus provided in the embodiments of the present application may be applied to a smart phone, a tablet computer and other types of mobile terminal or other electronic devices. More specifically, in the above electronic devices, a capacitive fingerprint system may be disposed on any surface of the electronic device interacting with the user, including but not limited to a front, back or side of the electronic device.

In the development of smart phones, the trend of a full screen is becoming more and more obvious. At present, the full screen design of an OLED screen with under-screen optical fingerprint brings users a good experience. For cost and feasibility considerations, an LCD screen is mainly based on the capacitive fingerprint. In order to adapt to the development of the full screen and optimize the user experience as much as possible at the same time, the trend of placing the capacitive fingerprint identification on the side of a mobile phone is getting stronger and stronger.

Figure 1:
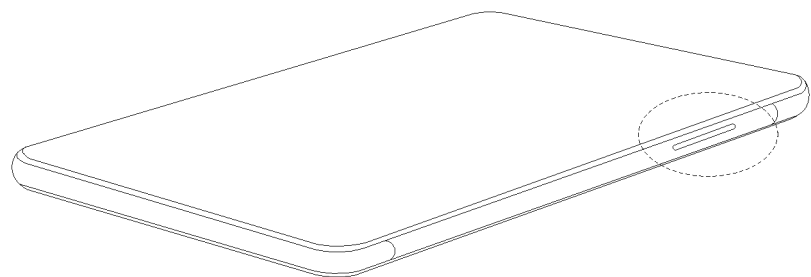
FIG. 1 is a schematic plan view of an electronic device applicable to the present application.

As an example, FIG. 1 shows a schematic view of an electronic device that may be used in the embodiments of the present application. As shown in FIG. 1, the electronic device where the capacitive fingerprint identification apparatus of the embodiments of the present application is located is a mobile phone, and the capacitive fingerprint identification apparatus is disposed at a circled position on the side of the mobile phone.

Figure 2:
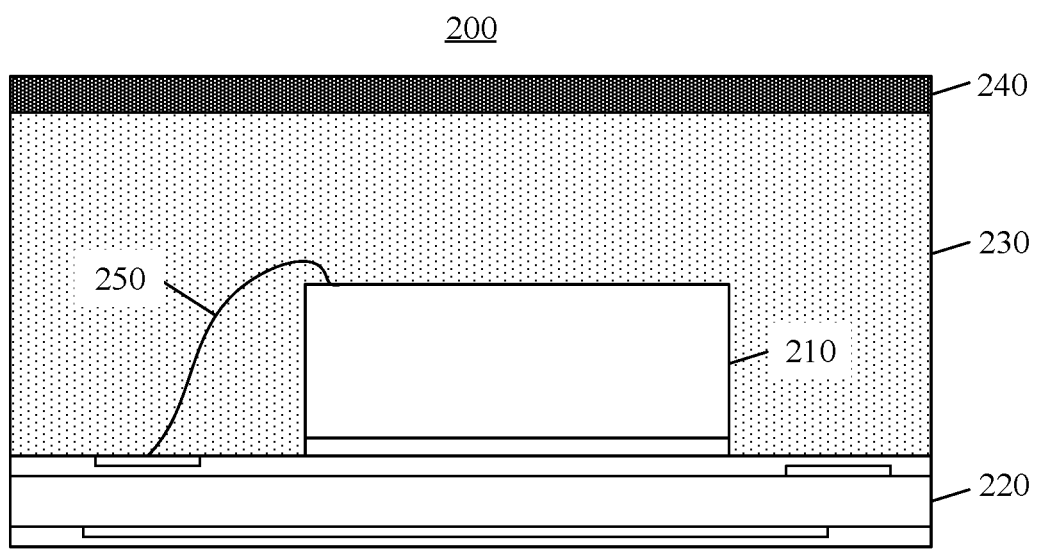
FIG. 2 is a schematic diagram of a planar capacitive fingerprint identification apparatus.

FIG. 2 shows a schematic diagram of a capacitive fingerprint identification apparatus 200, and the capacitive fingerprint identification apparatus 200 may be disposed at the circled position shown in FIG. 1. The capacitive fingerprint identification apparatus may be a device disposed on the plane of the electronic device.

As shown in FIG. 2, the capacitive fingerprint identification apparatus 200 may include: a capacitive fingerprint chip 210, a substrate 220, a packaging material layer 230, a coating layer 240 and an electrical connector 250.

Where the capacitive fingerprint chip 210 is configured to determine where a fingerprint ridge is located and where a fingerprint valley is located according to different capacitance values formed by the fingerprint ridge and the fingerprint valley of the fingerprint and sensing electrodes; the operating process is pre-charging a capacitive sensing electrode on each pixel electrode point to a certain reference voltage, when a finger touches a surface of a semiconductor capacitive fingerprint sensor, a capacitor array may be formed between a finger fingerprint and a pixel electrode array; and where a capacitance value of each fingerprint capacitor in the capacitor array becomes smaller as a distance between conductors increases, because the fingerprint ridge is convex, while the fingerprint valley is concave, according to the relationship between the capacitance value and the distance, different capacitance values are generated at the fingerprint ridge and fingerprint valley respectively.

Figure 3A:
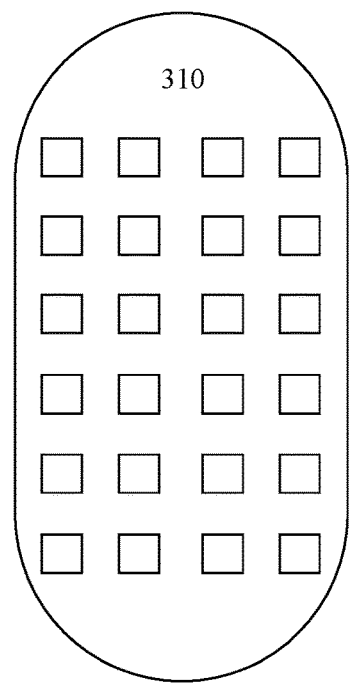
FIG. 3A and FIG. 3B are the schematic diagrams of a pixel electrode and capacitance between a finger and the pixel electrode.
Figure 3B:
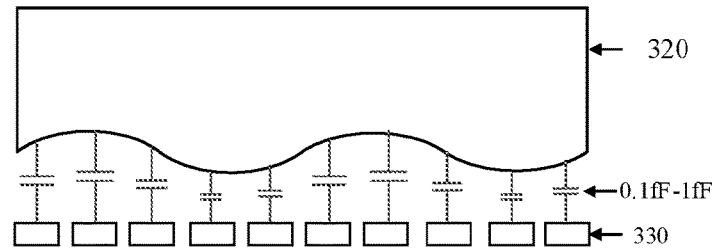

To put it simply, the capacitive fingerprint chip 210 may include a plurality of pixel electrode circuits, each pixel electrode circuit has a pixel electrode (i.e., a sensing electrode plate) to generate a fingerprint capacitor with texture on a surface of a finger, and all pixel electrodes form a pixel electrode array. Where since the distance between the fingerprint ridge and the pixel electrode is different from that between the fingerprint valley and the pixel electrode, the formed capacitance values of the fingerprint capacitor are different. Whether the pixel electrode is located at the fingerprint ridge or the fingerprint valley may be identified by detecting the capacitance value, and an imaging of the finger may be indirectly obtained, as a pixel electrode array 310 shown in FIG. 3A and a schematic diagram of capacitance formed between a finger 320 and a pixel electrode 330 shown in FIG. 3B.

Figure 4:
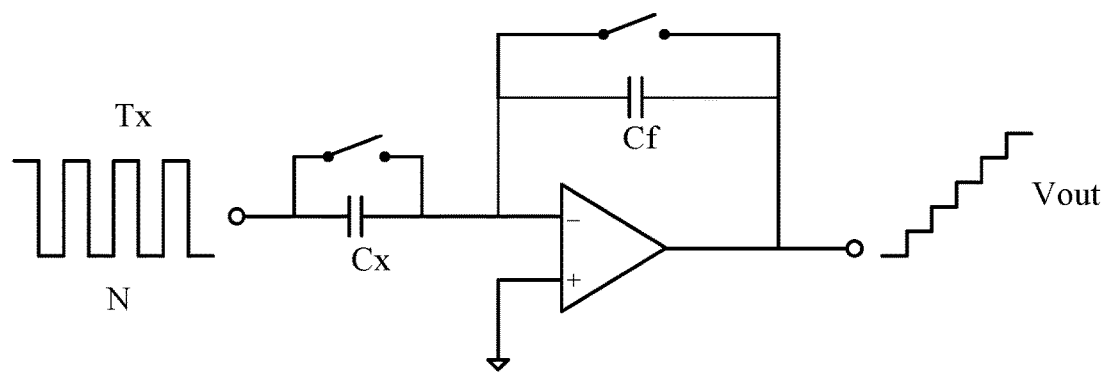
FIG. 4 is a circuit schematic diagram of a charge detection method.

It is more complicated to directly detect the capacitance to obtain the fingerprint image of the finger, a usual capacitance detection method is a charge detection method. As shown in FIG. 4, a circuit schematic diagram of the charge detection method is shown. When using the charge detection method to detect the capacitance of each pixel electrode, it is necessary to apply a certain voltage cycle to accumulate the charge, which is commonly known as signal driving, where the number of applied voltage cycles is the number of driving signals, and where the specific process of detecting the capacitance by using the charge detection method may refer to the prior art, which will not be described in detail in the embodiments of the application.

As shown in FIG. 4, where $T_x$ is a driving signal, $C_x$ is the capacitance to be measured, $C_f$ is the fixed capacitance, $V_{out}$ is an output voltage $V_{out}$ after performing signal driving to the pixel electrode, and N is the number of driving signals, where the output voltage $V_{out}$ is related to the number of driving signals N and the capacitance to be measured $C_x$. As shown in formula (1), it may be inferred from formula (1) that the larger the number of driving signals N, the larger the output voltage $V_{out}$, and the larger the corresponding obtained signal amount, and the size of the capacitance to be measured $C_x$ may be obtained indirectly by detecting the output voltage $V_{out}$. Further, the capacitive fingerprint identification apparatus 200 may use an analog-to-digital converter (ADC) to convert the output voltage $V_{out}$ to a digital signal, and the digital signal may be sent to s host (such as a mobile phone) terminal to realize the fingerprint identification.

$$V_{out} = N * \frac{C_x}{C_f} V_{Tx} \qquad (1)$$

As shown in FIG. 2, the capacitive fingerprint chip 210 may be a sensor chip, which may be disposed on the substrate 220 through an adhesive layer, such as a die attach film (DAF) adhesive layer, and connected to a pad of the substrate 220 through an electrical connector 250 (for example, a gold wire) to transmit the digital signal obtained by conversion to the circuit of the substrate 220 through the electrical connector 250, and further transmit the digital signal to other electronic modules on the substrate 220, or transmit to other electronic modules electrically connected with the substrate 220, the other electronic modules include but are not limited to a processing module or a storage module and the like.

Further, the packaging material layer 230 is coated around the capacitive fingerprint chip 210, and the packaging material layer 230 is configured to protect the capacitive fingerprint chip 210 and its electrical connector 250, and the surface of the packaging material layer 230 is a plane.

In addition, in the capacitive fingerprint identification apparatus 200, the coating layer 240 is further disposed on the packaging material layer 230, and the surface of the coating layer 240 is also a plane. Optionally, the coating layer 240 may be a coating layer with a color to further protect the capacitive fingerprint identification apparatus 200 and improve the aesthetic degree of the appearance. During the fingerprint identification process, the finger is placed on the surface of the coating layer 240 to affect the capacitance value detected by the capacitive fingerprint chip 210, and an area of the coating layer 240 corresponding to the capacitive fingerprint chip 210 may be described as a fingerprint detection area of the capacitive fingerprint identification apparatus 200.

At present, as shown in FIG. 1, in a terminal electronic device, in order to facilitate the users to hold and improve the user experience, or to improve the aesthetic degree of the appearance of the electronic device, the sides of most of the terminal electronic devices may be designed as arc surfaces. In this case, since the current capacitive fingerprint identification apparatus are mostly applied in the electronic device with a planar structure (for example, the capacitive fingerprint identification apparatus 200 shown in FIG. 2), if the planar capacitive fingerprint apparatus is embedded in the arc surface of the side of the mobile phone, it may not only affect the aesthetic degree of the appearance of the electronic device, but also affect the users' feeling of use. In addition, in harsh environments such as blown sand and dust, dust is often easily adsorbed on the plane of the capacitive fingerprint apparatus, resulting in misjudgment and other problems in fingerprint identification. Moreover, when a mobile phone is dropped, it may cause damage to a plane of the entire capacitive fingerprint identification apparatus, which may affect the performance of fingerprint identification apparatus. Further, in the current plane capacitive fingerprint identification, since the distances between each pixel electrode in the capacitive fingerprint apparatus and the surface of the planar structure are the same, the signal amount obtained by the fingerprint identification apparatus is basically the same corresponding to each part. However, for the electronic device with a special-shaped surface, and for the pixel electrode having a small distance from the special-shaped surface, the signal amount obtained by it is very low, which will affect the fingerprint identification. Moreover, due to the distances between the pixel electrodes and the special-shaped surface are different, the signal amount deviation of each part obtained by the capacitive fingerprint identification apparatus is larger, which is not conducive to algorithm processing, and the range of data fluctuation up and down is easy to be saturated, which affects the performance of fingerprint identification.

Based on the above problems, the embodiments of the present application provide a method for capacitive fingerprint identification, a capacitive fingerprint identification apparatus, and an electronic device. The method for capacitive fingerprint identification and the capacitive fingerprint identification apparatus may be applied to the electronic device with a special-shaped surface. Therefore, on the one hand, the user experience may be improved, on the other hand, the embodiments of the present application may separately allocate the number of driving signals of the pixel electrodes of different columns according to the distance between the pixel electrode and the special-shaped surface, so that the pixel electrode with a smaller distance from the special-shaped surface may have a higher number of driving signals, and the corresponding signal amount is increased to facilitate the fingerprint identification, at the same time, the signal amount obtained by the capacitive fingerprint identification apparatus may be controlled at a similar level to facilitate the algorithm processing, and the risk of data saturation with up and down fluctuations is reduced, and thereby the performance of fingerprint identification is improved.

For the convenience of description, in the following description of the embodiments of the present application, the feature that the special-shaped surface of the electronic device is an arc-shaped surface is taken as an example, but the embodiments of the present application are not limited thereto.

The capacitive fingerprint identification apparatus in the embodiments of the present application will be described in detail below with reference to the accompanying drawings.

Figure 5:
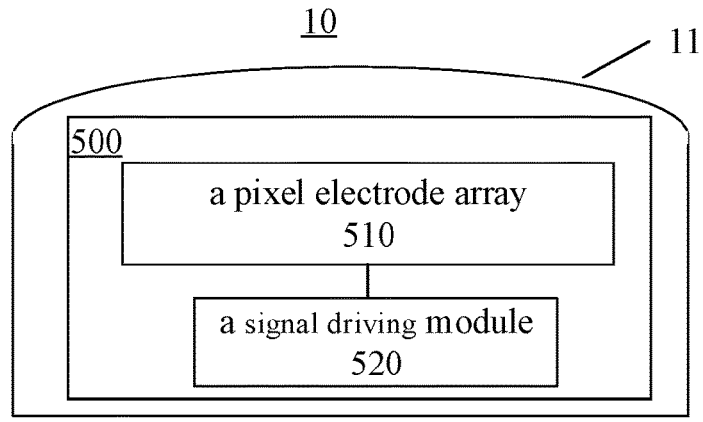
FIG. 5 is a schematic diagram of an arc-shaped surface capacitive fingerprint identification apparatus according to the embodiments of the present application.

FIG. 5 shows a schematic diagram of an electronic device 10 configured with a capacitive fingerprint identification apparatus 500 according to an embodiment of the present application. As shown in FIG. 5, the electronic device 10 includes an arc-shaped surface 11, and the capacitive fingerprint identification apparatus 500 includes a pixel electrode array 510 and a signal driving module 520.

Different from the planar capacitive fingerprint identification apparatus 200 shown in FIG. 2, since the arc-shaped surface 11 of the electronic device 10 is thick in the middle and thin on both sides, the signal amount obtained in the middle area of the capacitive fingerprint identification apparatus 500 disposed under the arc-shaped surface 11 is relatively low, which is not conducive to the capacitive fingerprint identification.

For ease of understanding, in the embodiments of the present application, the average value of the output voltage of each column of pixel electrodes is taken as an example to describe the problems that occur in a special-shaped (an arc surface is taken as an example in the embodiments of the present application) capacitive fingerprint identification.

Figure 6:
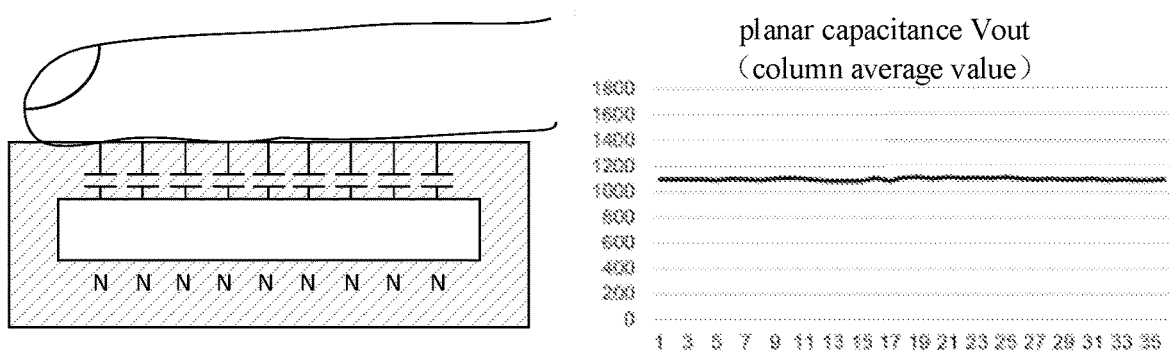
FIG. 6 is a schematic diagram of a planar capacitor structure and an output voltage.

In the traditional planar capacitive fingerprint identification as shown in FIG. 2, when a frame of fingerprint image is collected, the number of driving signals N is generally a fixed value, that is, all pixel electrodes use the same number of driving signals, and since the distance between the pixel electrode in the planar capacitive fingerprint identification apparatus and the touch interface of the finger is the same, an output $V_{out}$ at this time is relatively flat, as shown in FIG. 6.

Figure 7:
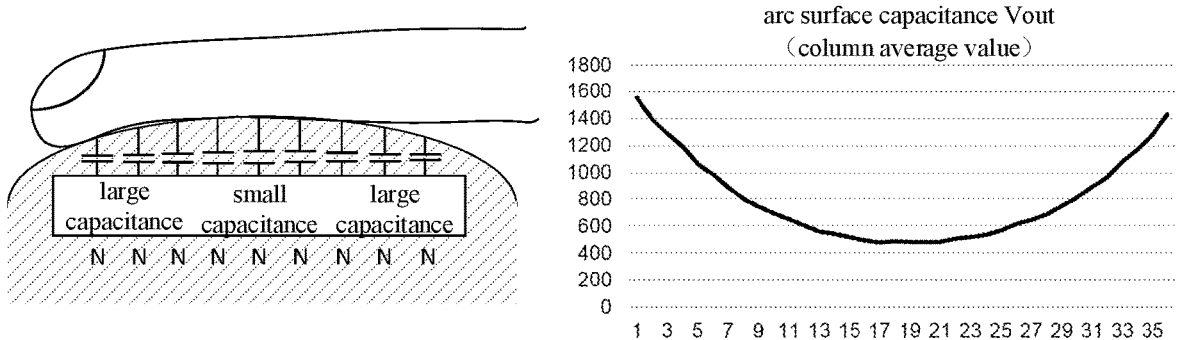
FIG. 7 is a schematic diagram of an arc surface capacitor structure and an output voltage.

However, in the capacitive fingerprint identification apparatus 500 applied to the electronic device 10 with the special-shaped surface shown in FIG. 5, since the arc-shaped surface 11 is thick in the middle and thin on both sides, equivalent capacitance $C_x$ in the middle area obtained by the capacitive fingerprint identification apparatus 500 is small, according to formula (1), in the case of using the same number of driving signals N, an average output voltage $V_{out}$ output by the pixel electrode corresponding to the middle area is relatively small. On the whole, the data as a whole presents an arc shape small in the middle and large on both sides, as shown in FIG. 7.

In the case of using the same number of driving signals N, the distance between the pixel electrode in the middle area of the capacitive fingerprint identification apparatus 500 and the arc-shaped surface 11 is larger, the detected capacitance value is small, and correspondingly, the output voltage $V_{out}$ is relatively small. This may cause the following two problems:

1) The signal amount obtained in the middle area is relatively small, causing the degradation of the performance of fingerprint identification; and
2) The output data as a whole presents an arc shape, which is not conducive to the algorithm processing, and the data is easy to be saturated with up and down fluctuations, which affects the performance of fingerprint identification.

However, the capacitive fingerprint identification apparatus 500 provided in the embodiments of the present application may solve the above problems, so that the capacitive fingerprint identification apparatus may be applied to the electronic device with the special-shaped surface. On the one hand, the user experience is improved, on the other hand, different number of driving signals is allocated for different columns of the pixel electrodes according to the distance between the pixel electrode and the special-shaped surface, which may increase the signal amount obtained in the middle area of the capacitive fingerprint identification apparatus 500 to be conducive to the fingerprint identification, and at the same time, the data obtained by the capacitive fingerprint identification apparatus 500 may be controlled at a similar level, which may be conducive to the algorithm processing, and the risk of data saturation with up and down fluctuations is reduced, thereby the performance of fingerprint identification is improved.

The capacitive fingerprint identification apparatus 500 in the embodiments of the present application is described in detail below.

It should be understood that the pixel electrode array 510 and the signal driving module 520 in the embodiments of the present application may be a part of the capacitive fingerprint chip mentioned in the preceding embodiments. Optionally, in addition to the pixel electrode array 510 and the signal driving module 520, the capacitive fingerprint chip of the embodiments of the present application may further include a functional module for data conversion, transmission and processing. For example, the functional module may include an ADC that converts the output voltage into a digital signal. In addition, the capacitive fingerprint chip may also include a storage module for storing the converted digital signal, which is not limited in the present application.

It should be understood that the embodiments of the present application only exemplarily describe some components of the capacitive fingerprint identification apparatus 500, and the capacitive fingerprint identification apparatus 500 may also include other parts, such as the substrate and the electrical connector shown in FIG. 2. The main focus of the embodiments of the present application is on the improvement of the signal driving method, and the components in the capacitive fingerprint identification apparatus 500 are not limited too much. Therefore, repeated descriptions are not repeated here.

Where the capacitive fingerprint identification apparatus 500 is disposed under the arc-shaped surface 11, the pixel electrode array 510 in it is configured to form capacitance with a finger touching the arc-shaped surface 11, the pixel electrode array 510 includes M columns of pixel electrodes, where each pixel electrode in the same column of pixel electrodes has a same distance from the arc-shaped surface 11, M is an integer greater than 1.

Figure 8:
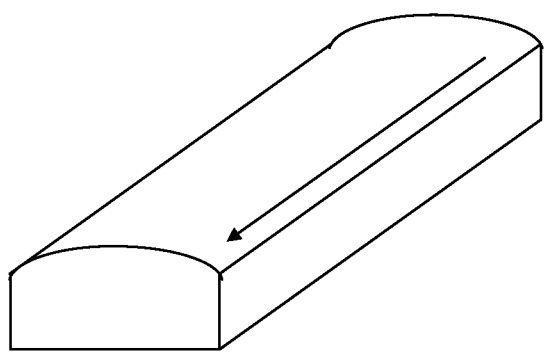
FIG. 8 is a schematic diagram of a column direction of the pixel electrode.

It should be understood that a column of pixel electrodes described in the embodiments of the present application refers to a column of pixel electrodes in a longitudinal direction with an equal distance between the pixel electrodes and the arc-shaped surface 11, as shown in FIG. 8 is a schematic diagram of the column direction of the pixel electrode. Alternatively, a column of pixel electrodes in the embodiments of the present application may also be a row of pixel electrodes in a horizontal direction with an equal distance between the pixel electrodes and the arc-shaped surface 11. As long as a plurality of adjacent horizontal or vertical columns of pixel electrodes with the same distance between the pixel electrode and the arc-shaped touch interface may be applicable to the method of allocating the number of driving signals described in the embodiments of the application, and there is no restriction on the setting of row and column in the present application.

The signal driving module 520 is configured to perform signal driving to the $i^{th}$ column of pixel electrodes to obtain an output voltage according to the number of driving signals N(i) of the $i^{th}$ column of pixel electrodes, the output voltage corresponds to the capacitor, and the output voltage is configured for fingerprint identification.

Where the number of driving signals N(i) corresponding to the $i^{th}$ column of pixel electrodes is positively correlated with a distance D between the $i^{th}$ column of pixel electrodes and the arc-shaped surface 11, i is a serial number of the M columns of pixel electrodes, i is an integer greater than or equal to 1, and i is less than or equal to M.

It should be understood that, in order to increase the signal amount obtained in the middle area of the capacitive fingerprint identification apparatus 500, the pixel electrodes in the middle area of the capacitive fingerprint identification apparatus 500 may be set to correspond to a larger number of driving signals. Specifically, the larger the distance between the $i^{th}$ column of pixel electrodes and the arc-shaped surface 11, the larger the number of driving signals corresponding to the $i^{th}$ column of pixel electrodes.

By allocating a larger number of driving signals N for the pixel electrode with a large distance between the pixel electrode and the arc-shaped surface 11, the middle area of the capacitive fingerprint identification apparatus 500 may obtain a larger signal amount, so as to improve the performance of capacitive fingerprint identification. At the same time, a flatter capacitive fingerprint signal may be obtained to facilitate the algorithm processing, so as to improve the performance of fingerprint identification.

As an embodiment, a value of the number of driving signals N(i) of the $i^{th}$ column of pixel electrodes of the present application may be related to an average output voltage value of the M columns of pixel electrodes when using the same number of driving signals.

Specifically, the number of driving signals N(i) of the $i^{th}$ column of pixel electrodes is expressed as:

$$N(i) = (\text{target value} - avgA(i)) * \frac{N_b - N_a}{avgB(i) - avgA(i)} + N_a,$$

where the target value is a predefined average output voltage value of each column of pixel electrodes, $N_a$ and $N_b$ are two different fixed number of driving signals, $N_a$ and $N_b$ are integers greater than or equal to 1, and avgA(i) and avgB(i) are the average output voltage values of the $i^{th}$ column of pixel electrodes corresponding to the number of driving signals $N_a$ and $N_b$ respectively.

Optionally, in order to facilitate the algorithm processing, and control the output voltage within a similar range and reduce the risk of data saturation with up and down fluctuations, the predefined target value in the embodiments of the application may be related to the output range of the conversion apparatus in the apparatus. Specifically, the capacitive fingerprint identification apparatus further includes an analog-to-digital conversion module configured to convert the output voltage, where the target value is half of a maximum output value of the analog-to-digital conversion module.

As an embodiment, the number of driving signals in the present application may be stored in a register, specifically, the capacitive fingerprint identification apparatus further includes: M registers, each register of the M registers is configured to store the number of driving signals N of each column of pixel electrodes, and the signal driving module is specifically configured to: performing signal driving to the M columns of pixel electrodes respectively according to the number of driving signals N of each column of pixel electrodes stored in each register.

Optionally, the capacitive fingerprint identification apparatus 500 in the embodiments of the present application may include M registers, in this case, each column of pixel electrodes may have one register, and each register stores the number of driving signals N corresponding to the column of pixel electrodes. Specifically, the capacitive fingerprint identification apparatus includes the M registers, and the M registers are in one-to-one correspondence with the M columns of pixel electrodes.

Optionally, the capacitive fingerprint identification apparatus 500 in the embodiments of the present application may further include a special-shaped touch interface, so as to be matched with the special-shaped surface of the electronic device 10, so as to perform the special-shaped capacitive fingerprint identification. Specifically, the capacitive fingerprint identification apparatus also includes: a special-shaped touch interface, the special-shaped touch interface is configured to accept the touch of a finger.

As an embodiment, the special-shaped touch interface is an arc-shaped touch interface.

Figure 9:
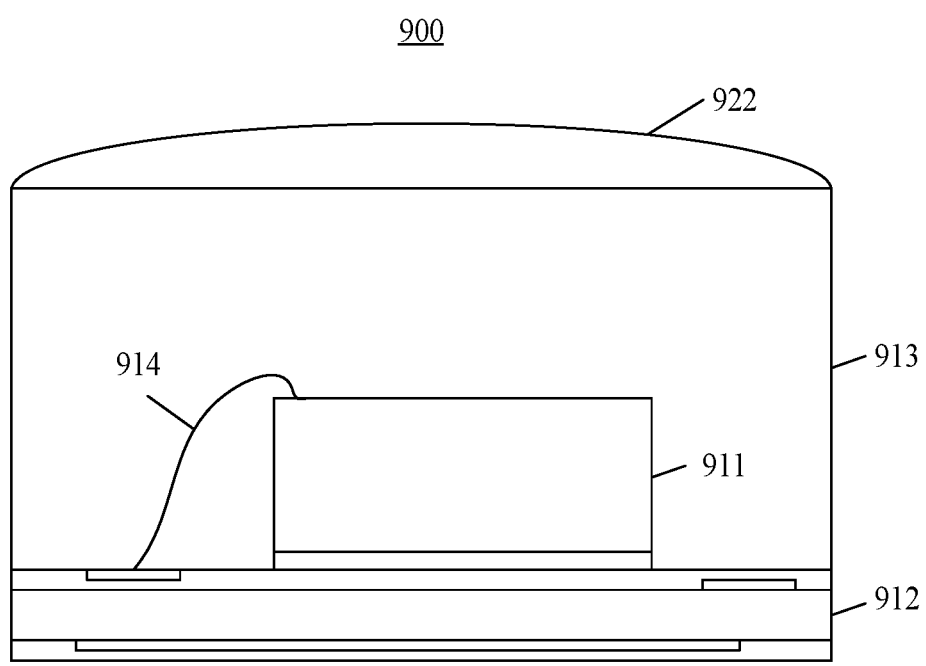
FIG. 9 is a schematic diagram of a capacitive fingerprint identification apparatus according to the embodiments of the present application.

FIG. 9 shows a schematic diagram of an arc surface capacitive fingerprint identification apparatus 900 of an embodiments of the present application. The difference from FIG. 2 is that the capacitive fingerprint identification apparatus 900 includes an arc-shaped touch interface 922 with an arc-shaped surface shape for receiving the touch of a user's finger, and the rest components are substantially the same as those in FIG. 2, such as including a capacitive fingerprint chip 911, a substrate 912, a packaging material layer 913, and an electrical connector 914, which are not limited in the embodiments of the present application.

Through the method of allocating the number of driving signals for the pixel electrode by column in the embodiments of the application, the signal amount of the middle area obtained by the capacitive fingerprint identification apparatus may be increased, so as to improve the performance of the fingerprint identification. At the same time, the average value of the output voltage $V_{out}$ of each column of pixel electrodes may be controlled to a similar level to facilitate the algorithm processing, and at the same time, the risk of data saturation with up and down fluctuations may be reduced, and thereby the performance of fingerprint identification may be improved.

Figure 10:
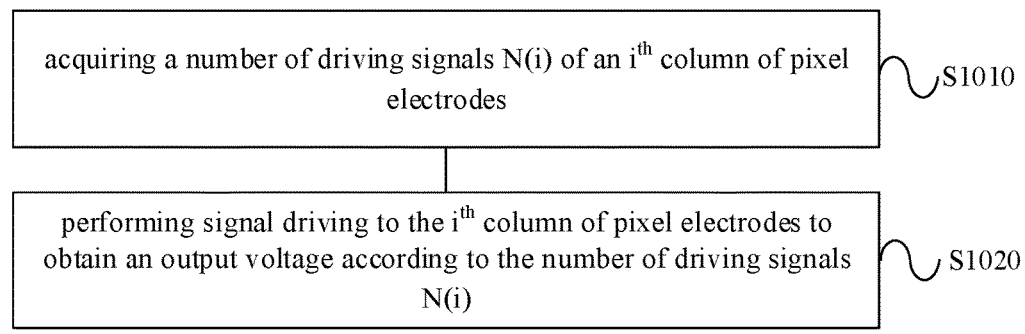
FIG. 10 is a schematic diagram of a method for capacitive fingerprint identification according to the embodiments of the present application.

FIG. 10 shows a schematic diagram of a method for capacitive fingerprint identification 1000 according to the embodiments of the present application. The method 1000 may be applied to an electronic device with a capacitive fingerprint identification apparatus, the capacitive fingerprint identification apparatus is configured to be disposed on a special-shaped surface of the electronic device, the capacitive fingerprint identification apparatus includes a pixel electrode array, the pixel electrode array is configured to form capacitance with a finger touching the special-shaped surface, the pixel electrode array includes M columns of pixel electrodes, where each pixel electrode in the same column of pixel electrodes has a same distance from the special-shaped surface, M is an integer greater than 1.

As shown in FIG. 10, the method 1000 includes step S1010 and step S1020.

S1010, acquiring a number of driving signals N(i) of an $i^{th}$ column of pixel electrodes.

S1020, performing signal driving to the $i^{th}$ column of pixel electrodes to obtain an output voltage according to the number of driving signals N(i).

As an embodiment, the output voltage corresponds to the capacitor, and the output voltage is configured for fingerprint identification.

As an embodiment, where the number of driving signals N(i) corresponding to the $i^{th}$ column of pixel electrodes is positively correlated with a distance D between the $i^{th}$ column of pixel electrodes and the special-shaped surface, i is a serial number of the M columns of pixel electrodes, i is an integer greater than or equal to 1, and i is less than or equal to M.

Optionally, a low number of driving signals in the embodiments of the present application may correspond to a column of pixel electrodes with a smaller distance between the pixel electrodes and the arc-shaped surface. Specifically, the larger the distance between the $i^{th}$ column of pixel electrodes and the arc-shaped surface, the larger the number of driving signals corresponding to the $i^{th}$ column of pixel electrodes.

Figure 11:
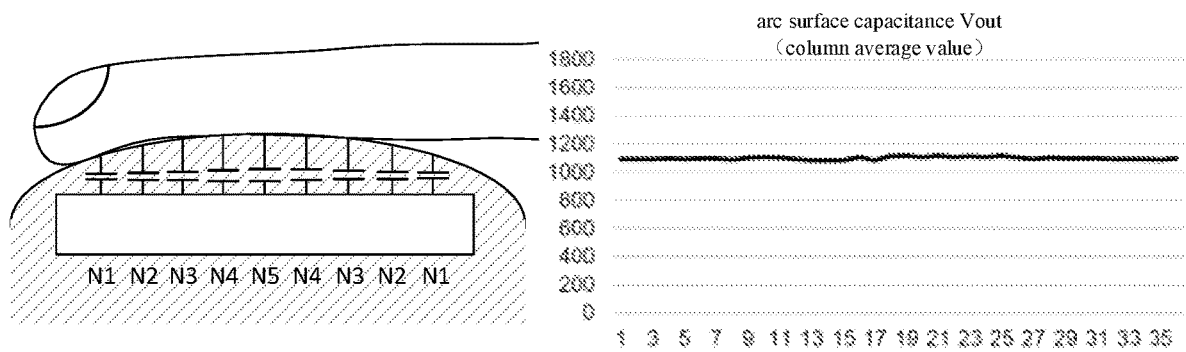
FIG. 11 is a schematic diagram of an average value of column output voltage value of N columns of pixel electrodes according to the embodiments of the present application.

FIG. 11 shows a schematic diagram of the column average output voltage $V_{out}$ corresponding to the M columns of pixel electrodes of the capacitive fingerprint identification apparatus according to the embodiments of the present application.

By allocating a larger number of driving signals to a column of pixel electrodes with a larger distance between the pixel electrodes and the arc-shaped surface, the value of the output voltage in the middle area may be increased, thereby the signal amount obtained in the middle area of the capacitive fingerprint identification apparatus is increased, so that the performance of fingerprint identification is improved, and at the same time, the average output voltage may be controlled at a similar level, which may facilitate the algorithm processing, thereby the performance of fingerprint identification may be improved.

As an embodiment, a value of the number of driving signals N(i) of the $i^{th}$ column of pixel electrodes of the present application may be related to an output voltage of all pixel electrodes in the capacitive fingerprint identification apparatus when using the same number of driving signals. Specifically, a value of the number of driving signals N(i) of the $i^{th}$ column of pixel electrodes may be related to an average output voltage value of the M columns of pixel electrodes when using the same number of driving signals.

Specifically, the number of driving signals N(i) of the $i^{th}$ column of pixel electrodes is expressed as:

$$N(i) = (\text{target value} - avgA(i)) * \frac{N_b - N_a}{avgB(i) - avgA(i)} + N_a,$$

where the target value is a predefined average output voltage value of each column of pixel electrodes, $N_a$ and $N_b$ are two different fixed number of driving signals, $N_a$ and $N_b$ are integers greater than or equal to 1, and avgA(i) and avgB(i) are the average output voltage values of the $i^{th}$ column of pixel electrodes corresponding to the number of driving signals $N_a$ and $N_b$, respectively.

The following provides a method for determining the number of driving signals N(i) in the embodiments of the present application by using the output voltage value of each column of pixel electrodes when all the pixel electrodes use the same number of driving signals.

As described above, the number of driving signals N(i) of the $i^{th}$ column of pixel electrodes of the present application may be determined by the output voltage $V_{out}$ obtained by all the pixel electrodes when using the same number of driving signals N. Specifically, according to the preceding formula (1), the output voltage $V_{out}$ of the pixel electrode in the capacitive fingerprint identification apparatus 500 is related to the number of driving signals N, and this conclusion may also be applied to the output voltage $V_{out}$ of each column of pixel electrodes and the number of driving signals N. Specifically, it may be expressed as the following formula (2):

$$V_{out}(i) = N(i) * \frac{C_x(i)}{C_f} V_{Tx} \qquad (2)$$

Where $V_{out}(i)$ is the output voltage value of the $i^{th}$ column of pixel electrodes, N(i) is the number of driving signals corresponding to the $i^{th}$ column of pixel electrodes, and $C_x(i)$ is a capacitance detection value corresponding to the $i^{th}$ column of pixel electrodes, and i represents the serial number of the M columns of pixel electrodes. It may be seen from formula (2) that the number of driving signals N(i) of the $i^{th}$ column of pixel electrodes is increased, so that the product of each column of N(i)*$C_x$ is as consistent as possible so that the output voltage $V_{out}(i)$ is similar.

However, due to various errors and nonlinearities of the device in actual situation, the relationship between the output voltage $V_{out}$ and the number of driving signals N is not completely positively correlated, but is linearly related within a certain range, that is, the relationship of y=kx+b is satisfied, so the revised formula (2) is formula (3).

$$V_{out}(i) = N(i) * \frac{C_x(i)}{C_f} V_{Tx} + b(i) \qquad (3)$$

Figure 12:
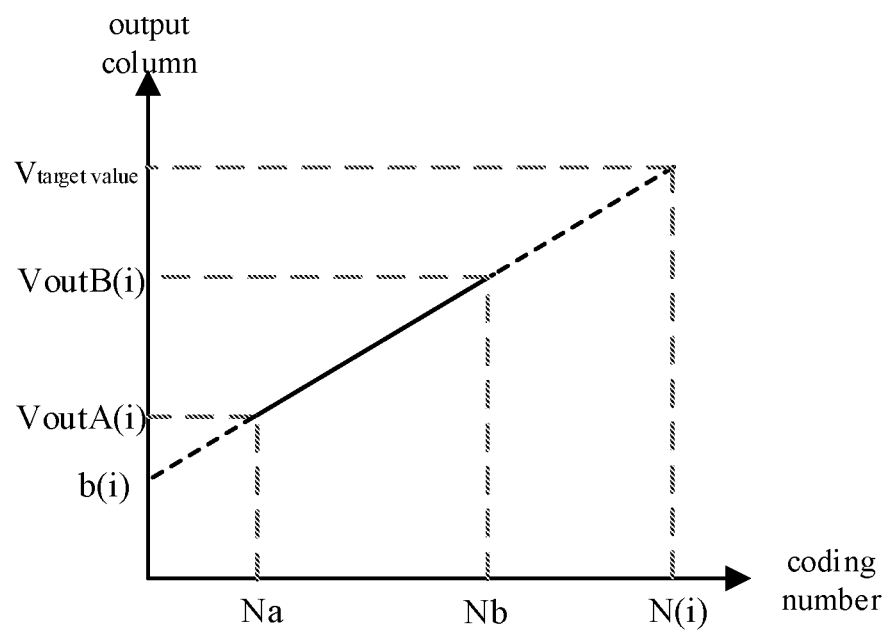
FIG. 12 is a schematic diagram of the relationship between the number of driving signals and the column output voltage of the pixel electrodes.

According to formula (3), it can be deduced that the relationship between the number of driving signals N(i) and the output voltage $V_{out}$ is a straight line intersecting at b(i) with the vertical axis. As shown in FIG. 12, specifically:

Since two points determine a straight line, to find the straight line, two fixed number of driving signals $N_a$ and $N_b$ may be used to obtain $V_{out}A(i)$ and $V_{out}B(i)$ of each column of pixel electrodes. Assuming that the obtained output of each column of pixel electrodes we expect is $V_{target\ value}$, the number of driving signals N(i) in each column may be acquired, as in formula (4):

$$N(i) = (V_{target\ value} - V_{out}A(i)) * \frac{N_b - N_a}{V_{out}B(i) - V_{out}A(i)} + N_a \qquad (4)$$

Where N(i) is the number of driving signals of the $i^{th}$ column of pixel electrodes, $V_{target\ value}$ is the predefined output voltage value of each column of pixel electrodes of the M columns of pixel electrodes, $N_a$ and $N_b$ are the two fixed number of driving signals, $V_{out}A(i)$ and $V_{out}B(i)$ are the output voltage values of the $i^{th}$ column of pixel electrodes corresponding to the number of driving signals $N_a$ and $N_b$, respectively.

Figure 13:
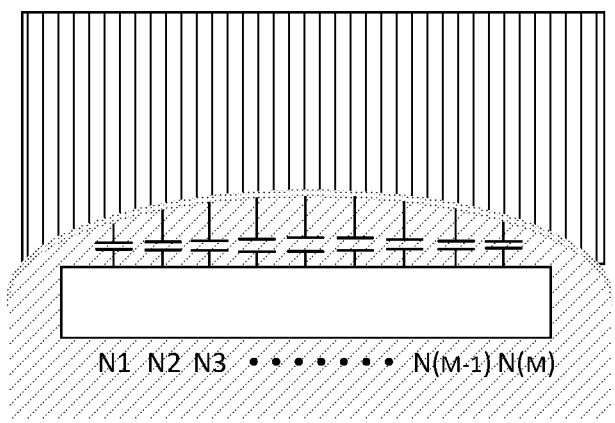
FIG. 13 is a schematic diagram of a rubber weight pressing according to the embodiments of the present application.

In actual operation, the number of driving signals N (i) of each column of pixel electrodes may be obtained according to the following steps:

1) Use the flat weight to press the surface of the module, as shown in FIG. 13 (the weight material may be conductive rubber to simulate finger pressing).

2) Use a fixed number of driving signals $N_a$ to collect a frame of data, and the average value of the output voltage $V_{out}$ of each column of pixel electrodes is denoted as avgA(i) (where the average output voltage value of each column of pixel electrodes may be equivalent to the output voltage value of each column of pixel electrodes).

3) Use a fixed number of driving signals $N_b$ to collect a frame of data, and the average value of the output voltage $V_{out}$ of each column of pixel electrodes is denoted as avgB(i) (where $N_b > N_a$).

Figure 14:
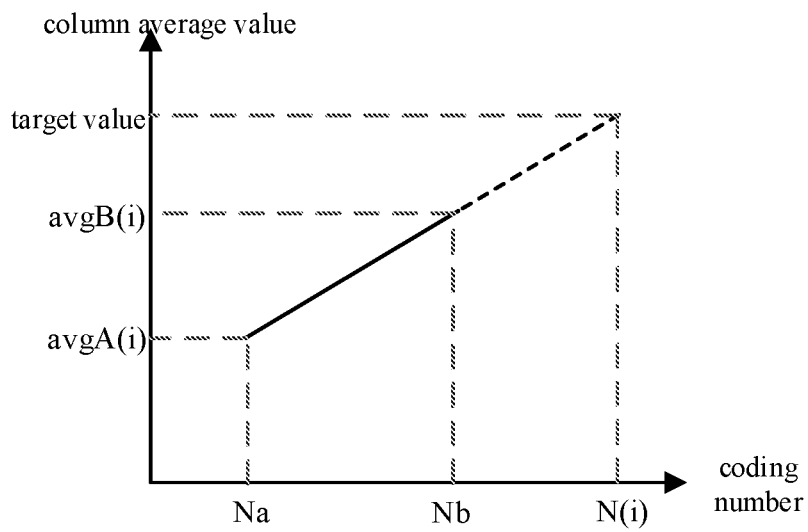
FIG. 14 is a schematic diagram of the relationship between the number of driving signals and the average value of the column output voltage according to the embodiments of the present application.

4) There is a relationship between the number of driving signals N and the column average value as shown in FIG. 14. According to this relationship, the number of driving signals N(i) corresponding to each column of pixel electrodes may be acquired, as shown in the following formula (5):

$$N(i) = (\text{target value} - avgA(i)) * \frac{N_b - N_a}{avgB(i) - avgA(i)} + N_a \qquad (5)$$

In order to control the column average output voltage value of the capacitive fingerprint identification apparatus of the embodiments of the present application to maintain at a similar level, so as to facilitate the algorithm processing, the above target value may be predefined. Where the target value may be set to be half of the maximum output value of the analog-to-digital converter, so that the up and down fluctuation of the output voltage $V_{out}$ may be covered in the output range of the analog-to-digital converter, so that the subsequent processing of the output data is ensured and the performance of capacitive fingerprint identification is improved. Specifically, the capacitive fingerprint identification apparatus 500 further includes an analog-to-digital conversion module configured to convert the capacitive fingerprint signal, where the target value is half of a maximum output value of the analog-to-digital conversion module.

For example, the analog-to-digital conversion module may be an analog-to-digital converter (ADC), and the output range of the ADC may be 0to 4095. Therefore, the above target value may be set to 2000 to facilitate data processing and further realize the fingerprint identification.

Or optionally, the target value may also be set to be between two-thirds to one-third of the ADC voltage output range, which may be specifically set according to actual situation, which is not limited in the embodiments of the present application.

As an embodiment, the above M number of driving signals may be stored in a register, specifically, the capacitive fingerprint identification apparatus further includes: M registers, each register of the M registers is configured to store the number of driving signals N of each column of pixel electrodes, and the method further includes: performing signal driving to the N columns of pixel electrodes respectively according to the number of driving signals N of each column of pixel electrodes stored in each register.

As an implementation manner, the capacitive fingerprint identification apparatus in the embodiments of the present application may include M registers. At this point, the M registers may correspond to M columns of pixel electrodes, and each register may be configured to store the corresponding number of driving signals N. Specifically, the capacitive fingerprint identification apparatus includes the M registers, and the M registers are in one-to-one correspondence with the M columns of pixel electrodes.

Figure 15A:
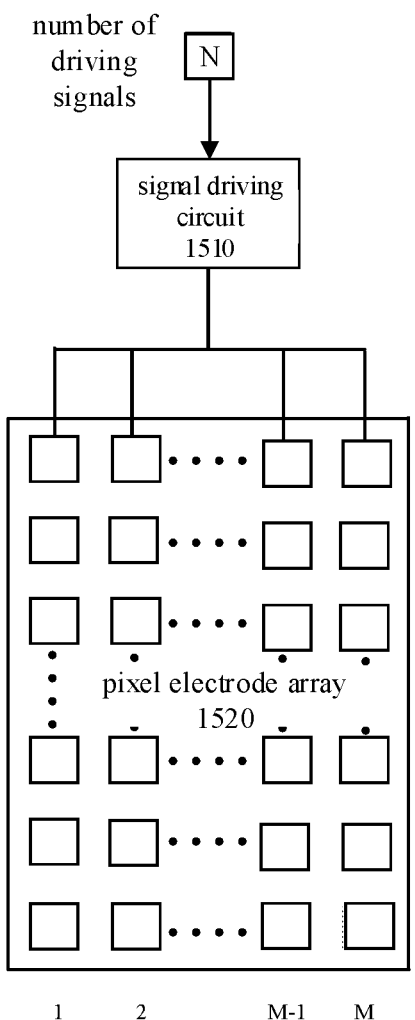
FIG. 15A is a circuit diagram of planar capacitive fingerprint identification in the prior art.
Figure 15B:
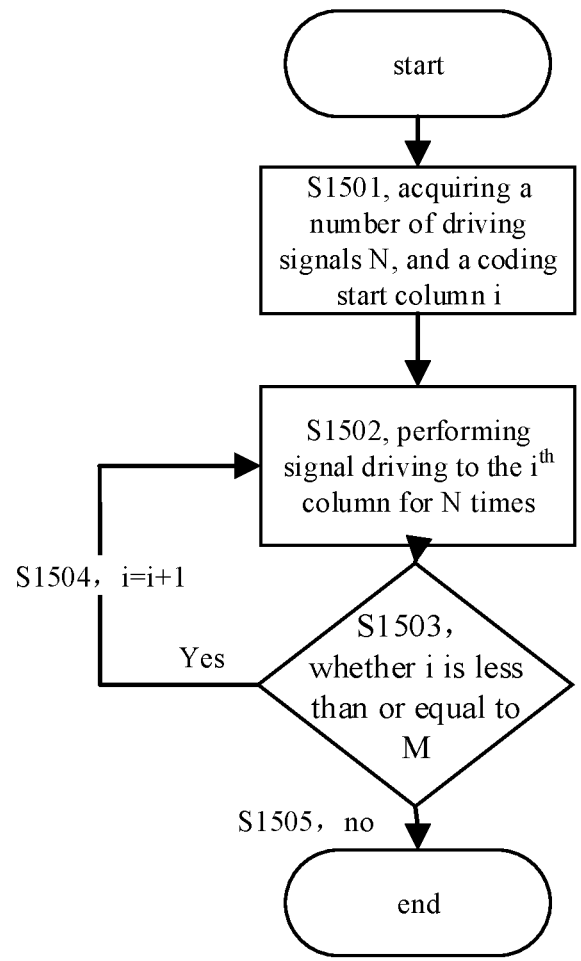
FIG. 15B is a signal driving schematic flowchart in the prior art.

In planar capacitive fingerprint identification, since all pixel electrodes use the same number of driving signals, the signal driving process is relatively simple. As shown in FIG. 15A and FIG. 15B, a circuit diagram 15A of the planar capacitive fingerprint identification and a signal driving schematic flowchart 15B in the prior art are shown. As shown in FIG. 15A, the circuit diagram includes a signal driving circuit 1510 and a pixel electrode array 1520, where the signal driving circuit 1510 has only one number of driving signals N, that is, all pixel electrodes use the same number of driving signals N, corresponding to the flowchart 15B, refer to steps S1501 to S1505 for details.

Figure 16A:
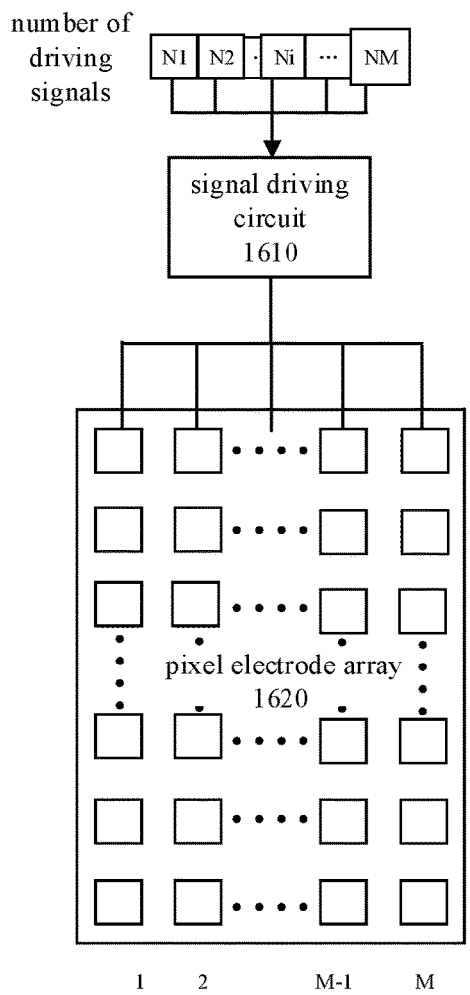
FIG. 16A is a circuit diagram of an arc surface capacitive identification according to the embodiments of the present application.
Figure 16B:
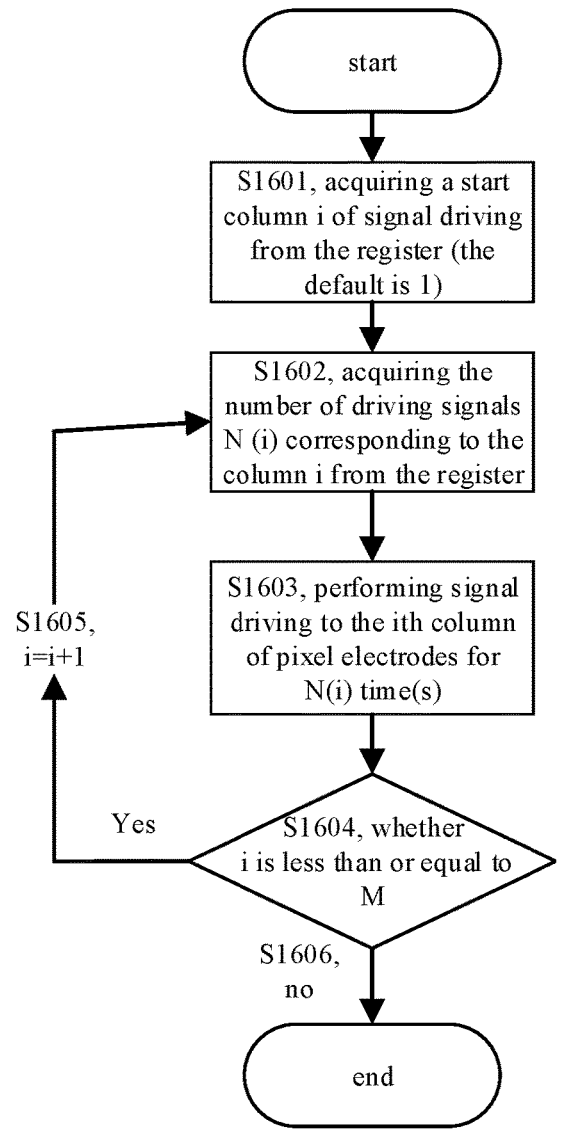
FIG. 16B is a signal driving schematic flowchart according to the embodiments of the present application.

Different from the planar capacitive fingerprint, FIG. 16A and FIG. 16B show a circuit schematic diagram 16A of allocating the number of driving signals by column and a signal driving schematic flowchart 16B according to the embodiments of the present application.

As shown in FIG. 16A, the difference from FIG. 15A is that the signal driving circuit 1610 of the embodiments of the present application includes the number of driving signals N(i) corresponding to each column of pixel electrodes, since the pixel electrode array 1620 has the M columns of pixel electrodes, the signal driving circuit 1610 may store M number of driving signals N.

As shown in FIG. 16B, the signal driving schematic flowchart of the embodiments of the application includes:

S1601, acquiring a start column i of signal driving from the register (the initial value of i is 1 by default).

S1602, acquiring the number of driving signals N (i) corresponding to the column i from the register.

S1603, performing signal driving to the $i^{th}$ column of pixel electrodes for N(i) time(s) to obtain an output voltage, performing AD conversion on the output voltage after completion, and then storing the data in a first input first output (FIFO) module.

S1604, judging whether i is less than or equal to the total number of columns M.

S1605, determining that i is less than or equal to the total number of columns M, and the operation of S1602 is continued.

S1606, determining that i is greater than the total number of columns M, and ending this signal driving process.

The method for capacitive fingerprint identification according to the embodiments of the present application allocates the number of driving signals for the pixel electrode by column, and the number of driving signals is positively correlated with the distance between the pixel electrode and the special-shaped surface. In this way, a position of the fingerprint identification apparatus with a large distance from the special-shaped surface may be made to obtain a larger output voltage, so that the performance of capacitive fingerprint identification may be improved. At the same time, it is conducive to control an average value of the output voltage at a similar level, so as to facilitate the algorithmic processing, and the risk of data saturation with up and down fluctuations may be reduced, thereby an aim of improving the performance of fingerprint identification is achieved.

Figure 17:
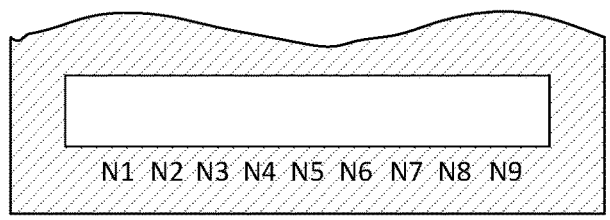
FIG. 17 is a schematic diagram of a special-shaped arc surface capacitive fingerprint apparatus according to the embodiments of the present application.

It should be understood that the method for capacitive fingerprint identification in the embodiments of the present application may be applied to regular arc-shaped interfaces as shown in FIG. 5 and FIG. 9, and may also be applied to an irregular arc-shaped interface, this can be achieved as long as the distance between one column (row) of pixel electrodes and the arc-shaped surface is the same, as the schematic diagram of the special-shaped arc surface capacitive fingerprint apparatus shown in FIG. 17, the embodiments of the present application do not limit the specific shape of the applicable special-shaped surface.

Figure 18:
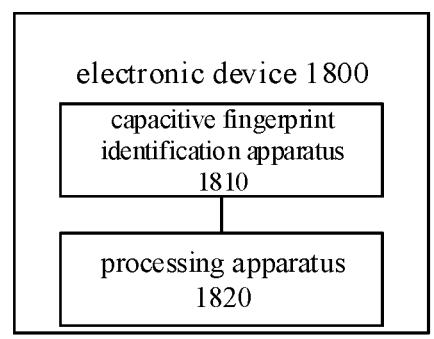
FIG. 18 is a schematic block diagram of an electronic device according to the embodiments of the present application.

It should be understood that the method 1000 according to the embodiments of the present application may be executed by a capacitive fingerprint identification apparatus in an electronic device. FIG. 18 shows a schematic block diagram of an electronic device 1800 according to the embodiments of the present application. As shown in FIG. 18, the electronic device 1800 includes a capacitive fingerprint identification apparatus 1810 and a processing apparatus 1820. Where the processing apparatus 1820 may process the data output by the capacitive fingerprint identification apparatus 1810 to realize the capacitive fingerprint identification. The capacitive fingerprint identification apparatus 1810 may correspond to the capacitive fingerprint identification apparatus in FIG. 5 and FIG. 9 and is suitable for the relevant description of the capacitive fingerprint identification apparatus. For simplicity, it will not be repeated here.

Those of ordinary skilled in the art may be aware that, a unit and an algorithm step of each example described in the embodiments disclosed herein may be implemented by an electronic hardware, or a combination of a computer software and an electronic hardware. Whether these functions are performed by a hardware or software depends on particular application and designed constraint condition of a technical solution. Those skilled in the art may use different methods to implement the described functions for every particular application, but it should not be considered that such implementation goes beyond the scope of the present application.

Those skilled in the art may clearly understand that, for convenience and simplicity of description, the specific working processes of the system, the apparatus and the unit described above may refer to corresponding processes in the preceding method embodiments, and will not be repeated redundantly herein.

The preceding descriptions are merely specific embodiments of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A method for capacitive fingerprint identification, wherein the method is applied to an electronic device with a capacitive fingerprint identification apparatus, the capacitive fingerprint identification apparatus is configured to be disposed on a special-shaped surface of the electronic device, the capacitive fingerprint identification apparatus comprises a pixel electrode array, the pixel electrode array is configured to form capacitance with a finger touching the special-shaped surface, the pixel electrode array comprises M columns of pixel electrodes, wherein each pixel electrode in the same column of pixel electrodes has a same distance from the special-shaped surface, M is an integer greater than 1, and the method comprises:

acquiring a number of driving signals $N(i)$ of an $i^{th}$ column of pixel electrodes;

performing signal driving to the $i^{th}$ column of pixel electrodes to obtain an output voltage according to the number of driving signals $N(i)$, the output voltage corresponds to the capacitor, and the output voltage is configured for fingerprint identification; and wherein the number of driving signals $N(i)$ corresponding to the $i^{th}$ column of pixel electrodes is positively correlated with a distance D between the $i^{th}$ column of pixel electrodes and the special-shaped surface, i is a serial number of the M columns of pixel electrodes, i is an integer greater than or equal to 1, and i is less than or equal to M;

wherein the number of driving signals $N(i)$ of the $i^{th}$ column of pixel electrodes is expressed as:

$$N(i) = (\text{target value} - avgA(i)) * \frac{N_b - N_a}{avgB(i) - avgA(i)} + N_a,$$

wherein the target value is a predefined average output voltage value of the M columns of pixel electrodes, $N_a$ and $N_b$ are two different fixed number of driving signals, $N_a$ and $N_b$ are integers greater than or equal to 1, and $avgA(i)$ and $avgB(i)$ are the average output voltage values of the $i^{th}$ column of pixel electrodes corresponding to the number of driving signals $N_a$ and $N_b$ respectively.

2. The method according to claim 1, wherein a value of the number of driving signals $N(i)$ of the $i^{th}$ column of pixel electrodes is related to an average output voltage value of the M columns of pixel electrodes when using the same number of driving signals.

3. The method according to claim 1, wherein the capacitive fingerprint identification apparatus further comprises an analog-to-digital converter configured to convert the output voltage, wherein the target value is half of a maximum output value of the analog-to-digital converter.

4. The method according to claim 1, wherein the capacitive fingerprint identification apparatus further comprises:

M registers, each register of the M registers is configured to store a number of driving signals N of each column of pixel electrodes, and the method further comprises:

performing signal driving to the N columns of pixel electrodes respectively according to the number of driving signals N of each column of pixel electrodes stored in each register.

5. The method according to claim 1, wherein the capacitive fingerprint identification apparatus further comprises:

a special-shaped touch interface, the special-shaped touch interface is configured to accept the touch of the finger.

6. The method according to claim 5, wherein the special-shaped touch interface is an arc-shaped touch interface.

7. A capacitive fingerprint identification apparatus, wherein the capacitive fingerprint identification apparatus is configured to be disposed on a special-shaped surface of an electronic device, the apparatus comprises:

a pixel electrode array, configured to form capacitance with a finger touching the special-shaped surface, the pixel electrode array comprises M columns of pixel electrodes, wherein each pixel electrode in the same column of pixel electrodes has a same distance from the special-shaped surface, M is an integer greater than 1;

a signal driving circuit, configured to perform signal driving to an $i^{th}$ column of pixel electrodes to obtain an output voltage according to a number of driving signals $N(i)$ of the $i^{th}$ column of pixel electrodes, the output voltage corresponds to the capacitor, and the output voltage is configured for fingerprint identification; and wherein the number of driving signals $N(i)$ corresponding to the $i^{th}$ column of pixel electrodes is positively correlated with a distance D between the $i^{th}$ column of pixel electrodes and the special-shaped surface, i is a serial number of the M columns of pixel electrodes, i is an integer greater than or equal to 1, and i is less than or equal to M;

wherein the number of driving signals $N(i)$ of the $i^{th}$ column of pixel electrodes i is expressed as:

$$N(i) = (\text{target value} - avgA(i)) * \frac{N_b - N_a}{avgB(i) - avgA(i)} + N_a,$$

wherein the target value is a predefined average output voltage value of each column of pixel electrodes, $N_a$ and $N_b$ are two different fixed number of driving signals, $N_a$ and $N_b$ are integers greater than or equal to 1, and $avgA(i)$ and $avgB(i)$ are the average output voltage values of the $i^{th}$ column of pixel electrodes corresponding to the number of driving signals $N_a$ and $N_b$ respectively.

8. The capacitive fingerprint identification apparatus according to claim 7, wherein a value of the number of driving signals $N(i)$ of the $i^{th}$ column of pixel electrodes is related to an average output voltage value of the M columns of pixel electrodes when using the same number of driving signals.

9. The capacitive fingerprint identification apparatus according to claim 7, wherein the capacitive fingerprint identification apparatus further comprises an analog-to-digital converter configured to convert the output voltage, wherein the target value is half of a maximum output value of the analog-to-digital converter.

10. The capacitive fingerprint identification apparatus according to claim 7, wherein the capacitive fingerprint identification apparatus further comprises:

M registers, each register of the M registers is configured to store a number of driving signals N of each column of pixel electrodes, and the signal driving circuit is specifically configured to:

perform signal driving to the M columns of pixel electrodes respectively according to the number of driving signals N of each column of pixel electrodes stored in each register.

11. The capacitive fingerprint identification apparatus according to claim 7, wherein the capacitive fingerprint identification apparatus further comprises:
a special-shaped touch interface, the special-shaped touch interface is configured to accept the touch of the finger.

12. The capacitive fingerprint identification apparatus according to claim 11, wherein the special-shaped touch interface is an arc-shaped touch interface.

13. An electronic device, comprising:
a processing apparatus; and
a capacitive fingerprint identification apparatus is configured to be disposed on a special-shaped surface of an electronic device, the apparatus comprises:
a pixel electrode array, configured to form capacitance with a finger touching the special-shaped surface, the pixel electrode array comprises M columns of pixel electrodes, wherein each pixel electrode in the same column of pixel electrodes has a same distance from the special-shaped surface, M is an integer greater than 1;
a signal driving circuit, configured to perform signal driving to an $i^{th}$ column of pixel electrodes to obtain an output voltage according to a number of driving signals N(i) of the $i^{th}$ column of pixel electrodes, the output voltage corresponds to the capacitor, and the output voltage is configured for fingerprint identification; and
wherein the number of driving signals N(i) corresponding to the $i^{th}$ column of pixel electrodes is positively correlated with a distance D between the $i^{th}$ column of pixel electrodes and the special-shaped surface, i is a serial number of the M columns of pixel electrodes, i is an integer greater than or equal to 1, and i is less than or equal to M, and
the processing apparatus processing data output by the capacitive fingerprint identification apparatus to realize capacitive fingerprint identification;
wherein the number of driving signals N(i) of the $i^{th}$ column of pixel electrodes i is expressed as:

$$N(i) = (\text{target value} - avgA(i)) * \frac{N_b - N_a}{avgB(i) - avgA(i)} + N_a,$$

wherein the target value is a predefined average output voltage value of each column of pixel electrodes, $N_a$ and $N_b$ are two different fixed number of driving signals, $N_a$ and $N_b$ are integers greater than or equal to 1, and avgA(i) and avgB(i) are the average output voltage values of the $i^{th}$ column of pixel electrodes corresponding to the number of driving signals $N_a$ and $N_b$ respectively.

14. The electronic device according to claim 13, wherein the special-shaped surface is an arc-shaped surface.

15. The electronic device according to claim 13, wherein the capacitive fingerprint identification apparatus is located on a side of the electronic device.

16. The electronic device according to claim 13, wherein a value of the number of driving signals N(i) of the $i^{th}$ column of pixel electrodes is related to an average output voltage value of the M columns of pixel electrodes when using the same number of driving signals.

17. The electronic device according to claim 13, wherein the capacitive fingerprint identification apparatus further comprises an analog-to-digital converter configured to convert the output voltage,
wherein the target value is half of a maximum output value of the analog-to-digital converter.

\* \* \* \* \*